(12) United States Patent
Blottiau (10) Patent No.: US 10,427,511 B2
(45) Date of Patent: Oct. 1, 2019

(54) RUN SEAL FOR VEHICLE WINDOW AND SEALING MODULE INCORPORATING MEANS FOR GUIDING THE WINDOW IN THE SEAL AND AN ELEMENT OF THE DOOR FRAME

(71) Applicant: HUTCHINSON, Paris (FR)

(72) Inventor: Olivier Blottiau, Cepoy (FR)

(73) Assignee: HUTCHINSON, Paris (FR)

( * ) Notice: Subject to any disclaimer, the term of this patent is extended or adjusted under 35 U.S.C. 154(b) by 22 days.

(21) Appl. No.: 15/568,521

(22) PCT Filed: Apr. 28, 2015

(86) PCT No.: PCT/FR2015/051147
§ 371 (c)(1),
(2) Date: Oct. 23, 2017

(87) PCT Pub. No.: WO2016/174315
PCT Pub. Date: Nov. 3, 2016

(65) Prior Publication Data
US 2018/0141421 A1    May 24, 2018

(51) Int. Cl.
*E06B 7/16* (2006.01)
*B60J 10/79* (2016.01)
(Continued)

(52) U.S. Cl.
CPC ............. *B60J 10/79* (2016.02); *B60J 5/0402* (2013.01); *B60J 10/17* (2016.02); *B60J 10/74* (2016.02); *B60J 10/88* (2016.02)

(58) Field of Classification Search
CPC ... B60J 10/79; B60J 10/17; B60J 10/74; B60J 10/88; B60J 5/0402
(Continued)

(56) References Cited

U.S. PATENT DOCUMENTS 4,240,227 A * 12/1980 Hasler ...................... B60J 10/79
49/348
4,418,498 A * 12/1983 Wanlass ................ E05F 11/382
49/348

(Continued)

FOREIGN PATENT DOCUMENTS

| EP | 0068367 | 1/1983 |
| EP | 0083696 | 7/1983 |
| FR | 2747345 | 10/1997 |

*Primary Examiner* — Jerry E Redman
(74) *Attorney, Agent, or Firm* — Lex IP Meister, PLLC (57) ABSTRACT

An elastomer run seal suitable for receiving a sliding window of a motor vehicle side door, and a sealing module comprising the seal, the window and means for guiding the window rigidly connected to the window in order to slidingly guide same in an offset manner in a groove of the seal are disclosed. The seal comprises at least one ascending strand and one top strand, the ascending strand having an outer branch to be mounted in sealing contact with the vertical edge element and the sliding window, an inner branch to be mounted on the frame and a connecting branch, a groove receiving, in a vertically sliding manner, means for guiding the window rigidly connected to the inner face of the same. The groove is formed on the outer branch and is suitable for being positioned facing the vertical element.

16 Claims, 5 Drawing Sheets

(51) Int. Cl.
- *B60J 10/74* (2016.01)
- *B60J 10/88* (2016.01)
- *B60J 10/17* (2016.01)
- *B60J 5/04* (2006.01)

(58) Field of Classification Search
USPC .......................... 49/440, 441, 495.1, 490.1
See application file for complete search history.

(56) References Cited

U.S. PATENT DOCUMENTS

| | | | | |
|---|---|---|---|---|
| 4,483,100 A * | 11/1984 | Blankenburg | ........ | E05F 11/426 49/352 |
| 4,490,942 A * | 1/1985 | Arnheim | ................ | B60J 10/24 49/374 |
| 4,567,691 A * | 2/1986 | Warner | ................ | B60J 10/79 49/374 |
| 4,581,851 A * | 4/1986 | Warner | ................ | B60J 10/248 428/122 |
| 4,604,830 A * | 8/1986 | Maeda | ................ | B60J 10/248 49/374 |
| 4,608,779 A * | 9/1986 | Maeda | ................ | B60J 10/248 428/122 |
| 4,611,435 A * | 9/1986 | Warner | ................ | B60J 10/79 49/374 |
| 4,621,453 A * | 11/1986 | Watanabe | ............ | B60J 10/79 49/227 |
| 4,625,459 A * | 12/1986 | Warner | ................ | B60J 10/235 49/489.1 |
| 4,628,637 A * | 12/1986 | Okada | ................ | B60J 10/79 49/374 |
| 4,631,865 A * | 12/1986 | Motonami | .......... | B60J 10/79 49/374 |
| 4,653,230 A * | 3/1987 | Seo | ................ | B60J 10/79 49/227 |
| 4,662,113 A * | 5/1987 | Weaver | ............ | B29C 45/14377 49/404 |
| 4,697,386 A * | 10/1987 | Watanabe | ............ | B60J 10/79 49/374 |
| 4,823,511 A * | 4/1989 | Herliczek | ............ | B60J 10/74 428/83 |
| 4,874,201 A * | 10/1989 | Scaglietti | ............ | B60J 10/24 296/201 |
| 4,875,307 A * | 10/1989 | Barbero | ................ | B60J 10/24 49/374 |
| 4,903,436 A * | 2/1990 | Rouillard | ............ | B60J 10/79 49/440 |
| 4,932,161 A * | 6/1990 | Keys | ................ | B60J 10/24 49/374 |
| 5,013,379 A * | 5/1991 | Brooks | ................ | B32B 25/08 156/244.11 |
| 5,054,242 A * | 10/1991 | Keys | ................ | B60J 10/24 49/374 |
| 5,086,589 A * | 2/1992 | dibenedetto | .......... | B60J 5/0402 296/146.3 |
| 5,613,325 A * | 3/1997 | Mariel | ............ | B32B 17/10036 49/374 |
| 5,732,509 A * | 3/1998 | Buehler | ................ | B60J 10/79 49/440 |
| 6,141,910 A * | 11/2000 | Kobrehel | ............ | B60J 5/0402 49/348 |
| 6,880,293 B2 * | 4/2005 | Ishikawa | ................ | B60J 1/17 49/414 |
| 8,434,267 B2 * | 5/2013 | Bocutto | ................ | B60J 10/235 296/93 |
| 8,561,353 B2 * | 10/2013 | Terai | ................ | B60J 1/007 49/440 |
| 8,561,354 B2 * | 10/2013 | Grudzinski | ............ | E05F 11/382 49/441 |
| 8,572,898 B2 * | 11/2013 | Grudzinski | ............ | B60J 5/0402 49/441 |
| 8,650,802 B2 * | 2/2014 | Grudzinski | ............ | B60J 5/0402 49/441 |
| 9,597,949 B2 * | 3/2017 | Nojiri | ................ | B60J 10/76 |
| 9,925,850 B2 * | 3/2018 | Yoshida | ................ | B60J 1/004 |
| 9,944,159 B2 * | 4/2018 | Dosaki | ................ | B60J 10/76 |
| 10,167,659 B2 * | 1/2019 | Sagisaka | ............ | B60J 1/17 |
| 2006/0021282 A1* | 2/2006 | Tamaoki | ............ | B60J 10/74 49/441 |
| 2006/0037249 A1 | 2/2006 | Kawamura | | |
| 2006/0059799 A1* | 3/2006 | Zimmer | ................ | B60J 1/08 52/204.1 |
| 2009/0309391 A1* | 12/2009 | Krause | ................ | B60J 10/79 296/201 |

\* cited by examiner

RUN SEAL FOR VEHICLE WINDOW AND SEALING MODULE INCORPORATING MEANS FOR GUIDING THE WINDOW IN THE SEAL AND AN ELEMENT OF THE DOOR FRAME

BACKGROUND

(1) Field

The present invention relates to an elastomer run seal suitable for receiving a sliding window of a front or rear motor vehicle side door, and a sealing module for such a side door comprising said seal, said window mounted sliding in the seal and means for guiding the window secured to an inner face of the window and able to guide it slidingly in an offset manner, directly in a groove formed in the seal. The invention applies to the guiding of such a window latterly flush with an outer surface of a vertical edge element of a frame of the door adjacent to the window chosen from among an upright of the frame and a vertical outer trim provided on the frame, such as a center pillar of the vehicle (this relationship of the window with respect to said vertical element is commonly called "flush", i.e., with the outer face of the window situated in the same lateral plane as that of said vertical element).

Hereinafter, the descriptors "axially inner" and "axially outer" will be used in the usual manner to refer to the position of an element of a sealing module laterally toward the inside and toward the outside of the motor vehicle, respectively, in reference to the axial direction Y, which is, by definition, perpendicular to the plane XZ defined by the longitudinal horizontal direction X and by the vertical direction Z of the vehicle (see FIG. 1a appended to this description).

(2) Description of Related Art

It is known to mount, on a motor vehicle, such a run seal whereof one or each ascending strand has a substantially U-shaped cross-section that comprises two axially inner and outer branches connected to one another by an axial connecting branch, and which receives a window laterally flush with the upright of the frame of the corresponding door or with the vertical trim equipping this frame (with, in some cases, this frame being hidden by the window). To that end, means for slidingly guiding the window in an offset manner in a rail of the door frame or in a groove of the run seal are used, these guide means typically being made up of pins or lugs that are offset in the longitudinal direction X of the vehicle and that are fastened on the inner face of the window near a vertical edge of the window.

One example of a sealing module procuring such a "flush" window is document US-A1-2006/0037249, which teaches causing such a lug to slide in a longitudinally offset manner, said lug being axially curved inward by a hook forming a slide only near lower and upper ends of an ascending U-shaped strand of the run seal, in a groove of the axially inner branch of this strand. The guide lug covers both the inner face and the edge of the window, and the ascending strand in which this hook slides bears on the window only by an end lip of its outer branch that is pressed on the outer face of the window. The inner branch is only pressed on the inner face of the lug.

Document US-A1-2006/0021282 also teaches, to obtain such a "flush" window, causing the sliding of an axial hook of a lug that is longitudinally offset and axially curved toward the inside of a groove formed in the inner branch of an ascending U-shaped strand of a run seal, with the inner and outer branches of this strand pressing on the lug, but without sealed contact of these branches with the window. In particular, the outer branch ends at a distance from the edge of the window, without covering this edge or the outer face of the latter.

One major drawback of the sealing modules proposed in these documents lies in the sliding of the hook of the lug in the inner branch of the ascending U-shaped strand of the run seal, which increases the bulk, in the axial direction Y of this strand, and makes it difficult, if not impossible, to mount the end sealing lip of the outer branch against the edge of the window so as to hide the play or interstitial space between this edge and the adjacent vertical outer trim and to exert sufficient pressure, and therefore sealing, on the window.

SUMMARY

One aim of the present invention is to propose an elastomer run seal suitable for receiving a sliding window of a motor vehicle side door that in particular resolves this drawback, the window being mounted laterally flush with an outer surface of a vertical edge element of a frame of the door adjacent to the window chosen from among an upright of said frame and a vertical outer trim equipping said frame, the seal comprising at least an ascending strand and a top strand, said at least one ascending strand having, in a single piece, an axially outer branch able to be mounted sealably in contact with said vertical element and the window, an axially inner branch able to be mounted on said frame, and a connecting branch connecting said axially outer branch to said axially inner branch, the seal comprising a groove able to receive, by vertical sliding, means for guiding the window secured to an inner face of the window.

To that end, a run seal according to the invention is such that said groove is formed on said axially outer branch while being suitable for being found across from said vertical element.

It will be noted that the formation of the groove of said at least one ascending strand of the seal, which slidingly receives the guide means of the window, specifically in the outer branch of this strand, makes it possible to keep enough lateral space in the axial direction Y to sealably apply the end lip of this outer branch against the edge of the window, unlike the prior art shown by the two aforementioned documents, where the groove was formed in the inner branch.

Thus and owing to the reduced lateral bulk in the direction Y of the seal in said at least one ascending strand, according to another feature of the invention, said axially outer branch can comprise, past said groove, a flexible outer end zone able to be mounted in sealed contact against a vertical edge of the window, such that said flexible outer end zone hides any mounting play or interstitial space between the window and said vertical element.

It will also be noted that the sliding of the guide means directly in said at least one ascending strand formed in a single piece (i.e., with no rail attached on this seal to produce this sliding) makes it possible to ensure, at the same time:

this improved sealing relative to the window mounted flush with respect to said outer surface of said vertical element by sealably applying the seal on the vertical edge of the window, which is made possible by the longitudinally offset guiding of the window by said means that protrude from the corresponding vertical edge of the window in the longitudinal direction X (as will be outlined below), and a continuous sealed contact of said at least one ascending strand with the inner face of the window below said guide means (see also below).

According to another feature of the invention, said groove can extend substantially axially while being formed from at least one rigid elastomer material between said connecting branch and a rigid bearing zone comprised by said axially outer branch and that is situated below said flexible outer end zone, said rigid bearing zone protruding axially inward and being able to press sealably on an axially outer face of said guide means.

Advantageously, said flexible outer end zone can extend said rigid bearing zone by forming an outer sealing lip that comprises:

a first portion that is oriented axially outward and that is able to be mounted sealably in contact with a vertical edge of said vertical element, and a second end portion that is oriented axially inward and that is able to be mounted sealably in contact with said vertical edge of the window.

Still more advantageously, said flexible outer end zone is not able to be mounted in contact with an outer face of the window, unlike the aforementioned document US-A1-2006/0037249.

It will be noted that said at least one ascending strand of a run seal according to the invention can be made from all elastomer materials that can be of the rubber and/or thermoplastic elastomer (TPE) type (for example, thermoplastic vulcanizates (TPV), or other TPEs, such as TPSs or TPOs, as non-limiting examples) that are more or less rigid and that may or may not be filled. As explained in more detail below, for the inner, outer and connecting branches, a plurality of such elastomer materials will be used defining different zones that are respectively flexible (in particular for sealing or mounting lips equipping the inner and outer branches) and more rigid (in particular for the major parts of the inner branch, the connecting branch and said groove of the outer branch).

According to another preferred feature of the invention, said rigid bearing zone comprises an axial bead that forms, with said connecting branch, which is also axial, edges of said groove, which is able to slidingly receive an end hook of said guide means and comprises a bottom optionally covered with an anti-friction coating. This coating can be made up of any known slippery layer identical to or different from that used for the various sealing lips equipping said axially inner and outer branches, for example high-density polyethylene (HDPE) or cross-linked polyethylene (PER), as non-limiting examples.

Advantageously, said axially outer branch is able to cooperate in an offset manner in the longitudinal direction of the vehicle with said guide means to simultaneously guide the sliding of the window in said longitudinal direction and further in an axial direction of the vehicle.

It will be noted that it is possible, owing to this offset guiding, to reasonably and non-isostatically control the amplitude of the simultaneous slight movements of the window in these two aforementioned horizontal directions X and Y during its vertical sliding, in particular with control of the movements toward the front and rear in this longitudinal direction X (i.e., movements typically called X+ and X− in abbreviated form), which was generally not possible in the aforementioned prior art.

Owing to the present invention, it is advantageously possible to control the play or interstitial space existing between the rounded edge of the window and said outer surface of said vertical element, which makes it possible to avoid having an unwanted shape of the "pool cue" type and/or such play with very different dimensions between the front edge and the rear edge of the window.

According to another feature of the invention, the seal may have a globally asymmetrical U shape, and said axially inner branch may end with a flexible inner end zone that is able to be mounted sealably on said inner face of the window separated from said guide means and that connects said at least one ascending strand to said top strand with continuous sealed contact over said inner face of the window despite the presence of said guide means.

It will be noted that this continuous contact of the seal between said at least one ascending strand and the top strand on the inner face of the window below the window means fastened to this face, allows a connection between these strands in a same plane and therefore without having to manage the slightest spatial offset associated with contact of the seal on the guide means for said at least one ascending strand and on the window itself for the top strand. Indeed, such an offset would constitute a sealing flaw of the run seal on the window, which is thus avoided by the present invention.

Advantageously, said flexible inner end zone may comprise an inner sealing lip that extends obliquely toward said connecting branch from a portion of said axially inner branch able to be mounted on said frame of the door, said portion for example comprising a recess intended to be mounted on an inner trim of said door frame or being curved directly against said frame.

A sealing module according to the invention for a motor vehicle side door comprises a run seal, a window of said door mounted sliding in the seal and means for guiding the window that are secured to an inner face of the window near at least one vertical edge of the window and that are able to guide the window slidingly in a longitudinally offset manner directly in a groove formed in the seal, such that the window is able to be mounted laterally flush with an outer surface of a vertical edge element of a frame of the door adjacent to the window chosen from among an upright of said frame and a vertical outer trim equipping said frame.

According to the invention, the sealing module is characterized in that the seal is as defined above.

According to another feature of the invention, said guide means can be formed by at least one slide extending continuously or discontinuously from said inner face of the window over at least one upper zone of said at least one vertical edge, the window comprising a vertical edge that is advantageously not covered by said at least one slide and against which said axially outer branch of the seal is sealably applied.

It will be noted that the or each slide fastened on the window can thus extend in a single piece (if continuous) or in several vertically separated parts (if discontinuous), only in the upper half of the height of the window or, alternatively, over its entire height for said or each front or rear vertical edge of the window.

It will also be noted that this guiding makes it possible to avoid any tilting of the window during upward sliding at an upper zone of its vertical edges.

Advantageously, said at least one slide may end with a hook that is curved axially outward and that slides in said groove made from at least one rigid elastomer material, such that the amplitude of the movement of the window is controlled by the sliding of said hook in said groove simultaneously in axial and longitudinal directions of the vehicle.

As indicated above, it will be noted that it is this curved end shape of the slide combined with the associated shape of the outer branch of said at least one ascending strand including this rigid groove that allows satisfactory control of the amplitude of the short X+ and X− movements of the window during sliding thereof in a vertical plane.

Still more advantageously, said at least one slide may comprise a base secured to said inner face of the window below said at least one vertical edge that extends axially inward, and that is extended by a leg extending substantially in the axial direction past said at least one vertical edge and ending with said hook.

It will be noted that the or each slide may be made from at least one metal, plastic (e.g., thermoplastic, for example polyamide) or plastic matrix composite material, and that the slide can be fastened by gluing or optionally welded or co-injected in the particular case where the window is made from a plastic material.

According to another aspect of the invention, the module further comprises said vertical element across from which said hook and said groove cooperate by sliding. Furthermore, a flexible outer end zone comprised by said axially outer branch of the seal and that is pressed both against a vertical edge of said vertical element and against said vertical edge of the window can advantageously conceal any mounting play or interstitial space between the window and said vertical element.

According to one example embodiment of the invention, said at least one slide incorporating said hook extends substantially over the entire height of said at least one vertical edge.

Advantageously, said axially inner branch of the seal may end with a flexible inner end zone that is mounted sealably on said inner face of the window separated from said guide means and that can connect said at least one ascending strand to said top strand with continuous sealed contact over said inner face of the window, with the aforementioned advantages.

In summary, using this sealing module according to the invention, it is possible to obtain continuous sealing for said at least one ascending strand and said top strand, both on the outer face and on the inner face of the window. Other features, advantages and details of the present invention will emerge from reading the following description of one example embodiment of the invention, provided as an illustration and non-limitingly, the description being done in reference to the attached drawings.

DETAILED DESCRIPTION

Figure 1A:
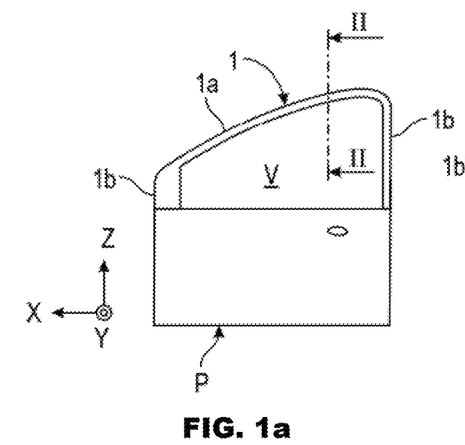
FIGS. 1a and 1b are schematic side views respectively showing a front door and a rear door of a motor vehicle of the sedan type provided with windows mounted sliding in run seals that may be according to the invention.
Figure 1B:
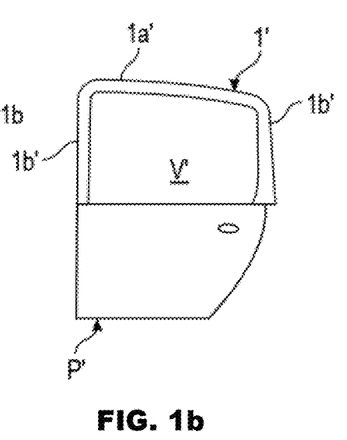
Figure 2:
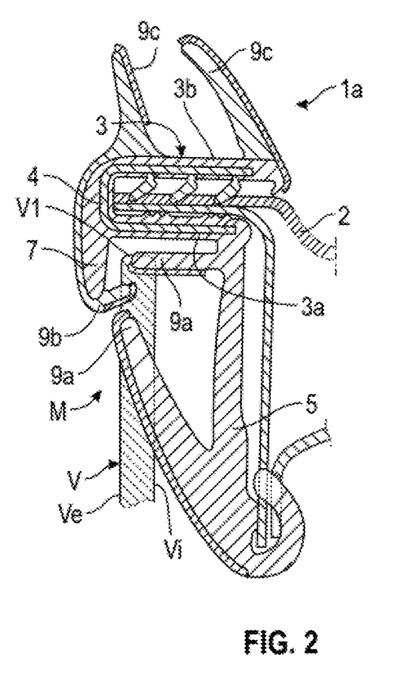
FIG. 2 is a cross-sectional view along plane II-II of FIG. 1a of an example top strand for a run seal according to the illustrated invention, in the non-stressed state, mounted on a door frame against a window of said door and an upper part of the body of the motor vehicle.
Figure 2A:
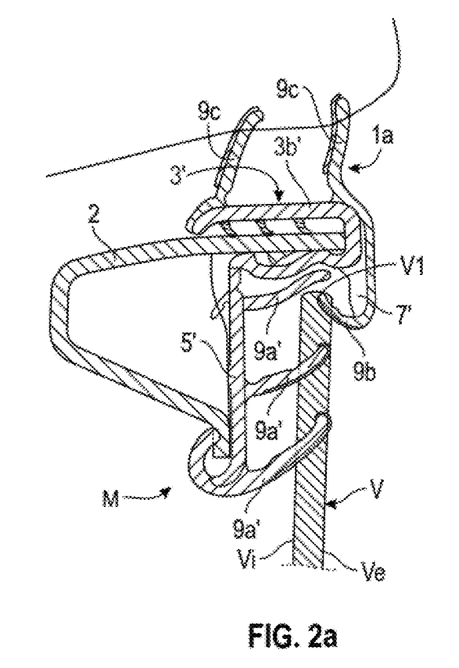
FIG. 2a is a cross-sectional view along plane II-II of FIG. 1a of another example top strand for a run seal according to the illustrated invention, in the non-stressed state, mounted on a door frame against a window of said door and an upper part of the body of the motor vehicle.
Figure 2B:
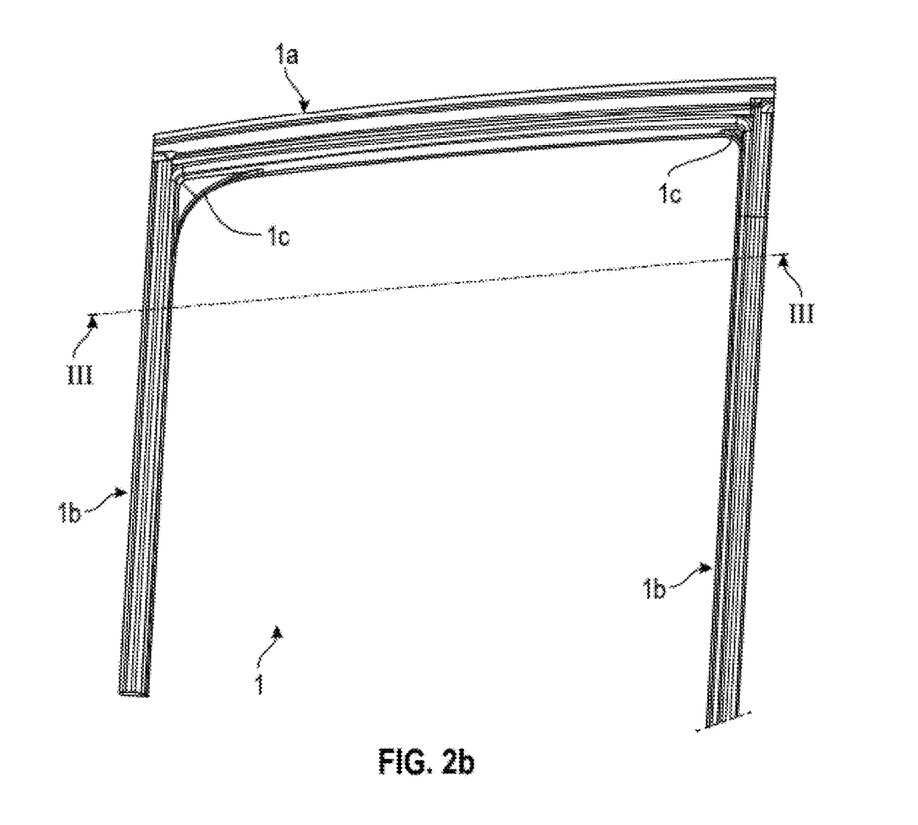
FIG. 2b is a side view of a run seal according to one example of the invention with two ascending strands connected to one another by a top strand.

Each run seal 1, 1' illustrated in FIGS. 1a, 1b and 2b that is mounted on a frame (not shown) of a front door P and/or a rear door P' of a motor vehicle to receive a front V or rear V' window during upward and downward sliding thereof in the vertical direction Z of the vehicle, includes, in the usual manner:

a top strand 1a, 1a' that is substantially horizontal or inclined extending in the longitudinal direction X of the vehicle, and two ascending strands 1b, 1b' connected to the top strand 1a, 1a', for example by short molded connectors 1c (visible in FIG. 2b).

Figure 3:
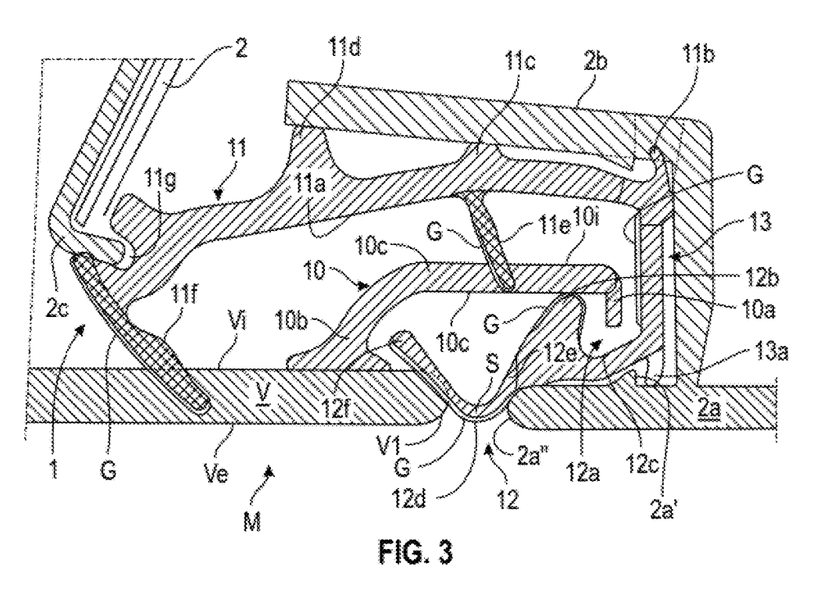
FIG. 3 is a cross-sectional view along plane III-III of FIG. 2b of a rear ascending strand according to the invention of this illustrated seal, in the non-stressed state, mounted according to a first embodiment of the invention on the door frame against this window and flush against a vertical outer trim forming a center pillar.

FIG. 1a also shows the lateral direction Y of the vehicle defining the axial depth of the sealing module M illustrated in FIGS. 2 and 3, this module M essentially comprising:

the run seal 1, the window V of the door mounted sliding in the seal 1, guide means 10 of the window V formed by at least a slide secured to an inner face V of the window in the immediate vicinity of at least one of its vertical edges (i.e., in particular the rear vertical edge in the example of FIG. 3) and able to guide the sliding of the window V in the seal 1 in an offset manner in the direction X, and a vertical outer trim 2a of the frame 2 of the door adjacent to the window V forming, in this example, a center pillar trim 2a, with the axially outer surface of which the window V is mounted laterally flush (i.e., in a same substantially vertical plane).

In the example of FIG. 2, the top strand 1a essentially comprises, in a known manner:

a fastening clamp 3 with a straight U-shaped section in which a reinforcing web 4, for example made from metal and also with a straight U-shaped section, is embedded, two asymmetrical legs 5 and 7 respectively made up of an axially inner primary leg 5 and an axially outer secondary leg 7 that extend, substantially at 90°, a branch 3a of the clamp 3 and that end with sealing lips 9a and 9b able to come into sliding contact with the two inner Vi and outer Ve faces of the window V, the other branch 3b of the clamp 3 supporting sealing lips 9c able to come into contact with the body of the vehicle.

More specifically, the inner leg 5 is provided with:

two inner lips 9a, one of which, called top, bears sealably on the edge V1 of the window V and the other of which, called lower, bears on the inner face Vi of the window V), and at least one outer lip 9b bearing on the outer face Ve of the window V.

In the alternative of FIG. 2a, the top strand 1a essentially comprises, in a known manner:

a fastening clamp 3' with a globally U-shaped straight section, but with no reinforcing web (the clamp 3' is made from a very rigid material, for example with a base of a thermoplastic elastomer of the olefin type, abbreviated TPO, or with a base of the polyolefin type, such as polypropylene, abbreviated PP, reinforced by a filler such as talc), two asymmetrical legs 5' and 7' similar to those of FIG. 2 that end with similar sealing lips 9a' and 9b, the other branch 3b' of the clamp 3 supporting the sealing lips 9c, also similar.

More specifically, the inner leg 5' is provided with:

three inner lips 9a' (instead of the two inner lips 9a of FIG. 2), one of which, called top, bears sealably on the edge V1 of the window V and the other two of which 9a' bear on the inner face Vi of the window V, and at least one outer lip 9b bearing on the outer face Ve of the window V.

The sealing module shown in FIG. 3 for example for the rear ascending strand 1b of the front door P provided with the window V and the center pillar trim 2a is in particular characterized by the following particular structure of the run seal 1 according to the invention for this ascending strand 1b.

The seal 1 is completely made in a single piece from elastomer materials with different hardnesses, and it is globally in the form of an asymmetrical U with two axially inner 11 and outer 12 branches that each extend substantially in the longitudinal direction X in cross-section and that are connected to one another by an axial connecting branch 13 forming the core of the U.

The inner branch 11 essentially comprises:

a rigid primary portion 11a (for example with a base of a rigid TPV of the Vegaprene® type able to have a Shore D hardness of about 45, non-limitingly) extending substantially in the direction X that is mounted on an inner structure 2b, for example L-shaped, of the center pillar trim 2a by protrusions 11b, 11c, 11d oriented axially inwardly that it has, including an inner deformable protrusion 11b that is provided like an articulation at the junction between the connecting branch 13 and the inner branch 11 and that forms an attaching lip to the structure 2b, and two flexible inner sealing lips 11e and 11f for example with a base of a flexible TPV also of the Vegaprene® type and coated with a slippery coating G, for example made from cross-linked polyethylene), which comprise:

an inner intermediate lip 11e that extends axially outward from about a first third of the length of the primary portion 11a from the deformable protrusion 11b and that is designed to press sealably on an inner face 10i of the guiding slide 10, and an inner end lip 11f that obliquely (inclined toward the connecting branch 13) extends the end of the primary portion 11a and that is designed to press sealably on the inner face Vi of the window V significantly below the guiding slide 10, having specified that the junction between the primary portion 11a and the end lip 11f forms a recess 11g intended to be mounted on a curved end of an inner trim 2c equipping the door frame 2.

The connecting branch 13, essentially rigid (for example with a base of a rigid TPV of the Vegaprene® type like that of the primary portion 11a of the inner branch 11) extends axially outward from the inner deformable protrusion 11b up to another outer deformable protrusion 13a formed by a short lip wedged bearing against the inner face of the outer vertical trim 2a via a protuberance 2a' of this inner face.

The outer branch 12 essentially comprises:

an axial groove 12a, one edge of which is formed by the connecting branch 13 and the other edge of which is formed by a rigid bead 12b extending protruding axially inward (in this example, inclined slightly toward the connecting branch 13) and whereof the bottom 12c (in this example inclined toward the bead 12b axially outward) can be covered by an antifriction coating G (for example, cross-linked polyethylene, like the coatings G covering the bead 12b and the connecting branch 13) to receive, by sliding contact, a guiding hook 10a forming a curved free end of the slide 10, and a flexible outer sealing lip 12d (for example, like the inner sealing lips 11e and 11f and the deformable inner 11b and outer 13a protrusions, with a base of a flexible TPV such as Vegaprene® covered by a sliding coating G for example made from cross-linked polyethylene) that forms the free end of the outer branch 12 from the rigid bead 12b and that comprises:

a first oblique portion 12e that is curved axially outward to a rounded outer apex S of the lip 12d substantially situated, when idle, in the median plane of the window V and the trim 2a, and which is designed to be mounted sealably in contact with a vertical edge 2a" of the outer trim 2a, and a second oblique end portion 12f that extends the first portion 12e while being curved axially inward from the outer apex S and which is designed to be mounted slanted sealably in contact with an axially inner part of the vertical edge V1 of the window V while ending toward the inside and across from the inner face Vi of the window V.

The or each offset guiding slide 10 is for example made from a plastic material such as a polyamide, extends at least over an upper zone of the vertical edge adjacent to the window V, and comprises:

a wider base 10b that is secured to the inner face Vi of the window V below this edge and which extends axially inward in an inclined manner toward the connecting branch 13 in this example, and an axial leg 10c that extends the base 10b in an offset manner in the direction X, against which the inner intermediate lip 11e (on the inner face 10i of the leg 10c) and the bead 12b (on the outer face 10e of the leg 10c near its free end) bear, and which ends with the axial hook 10a curved axially outward.

Figure 3A:
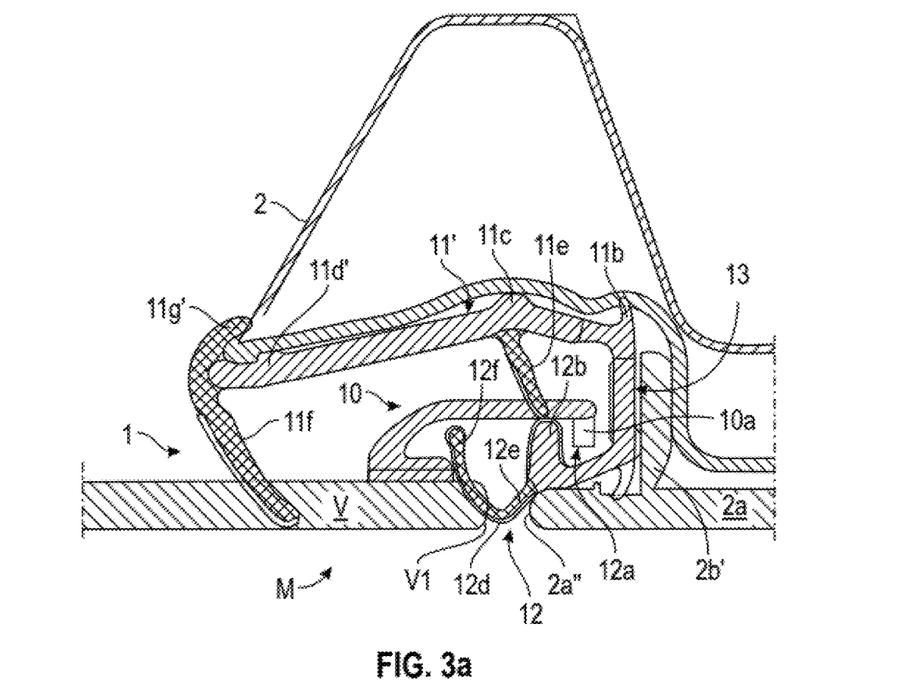
FIG. 3a is a cross-sectional view along plane III-III of FIG. 2b of a rear ascending strand according to an alternative of FIG. 3 mounted according to this first embodiment on this frame against this window and flush against this trim.

In the alternative of FIG. 3a, the seal 1 illustrated by at least one of its ascending strands 1b essentially differs from that of FIG. 3 by the geometry of its axially inner branch 11', which here is mounted over substantially its entire length against the door frame 2, which in turn practically marries its profile, while in FIG. 3, the trim was mounted against an L-shaped structure 2b extending the trim 2a axially inward.

More specifically, the inner branch 11' ends with a portion 11g' that is curved toward the connecting branch 13 and that bears against an edge of the frame 2, in place of the recess 11g. Furthermore, the inner branch 11' has a third protrusion 11d' that is mounted against the frame 2 while being formed in the immediate vicinity of this curved portion 11g', just below the latter.

FIG. 3a shows that the trim 2a extends axially inward solely by an axial structure 2b' that is jammed between the connecting branch 13 and an axial portion of the frame 2a.

Figure 4:
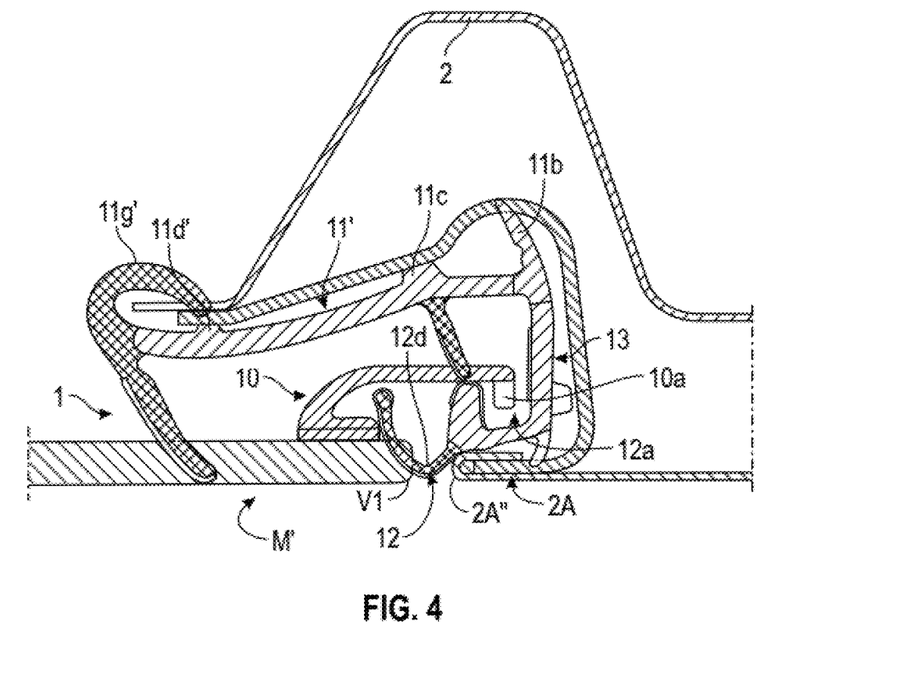
FIG. 4 is a cross-sectional view along plane III-III of FIG. 2b of a rear ascending strand according to an alternative of FIGS. 3 and 3a corresponding to a second mounting mode according to the invention of this strand, on a door frame against this window, but flush with an upright of the door frame itself.

In the second mounting mode of FIG. 4, a seal 1 similar to that of FIG. 3a is mounted laterally flush with the axially outer surface of an edge upright 2A of the door frame 2 itself (and not flush with an outer vertical trim 2a, as is the case for FIGS. 3 and 3a). FIG. 4 shows that the seal 1 is mounted sealably by at least one of its two ascending strands 1b both against the edge 2A" of the upright 2A and the edge V1 of the window V.

It should be noted that the outer sealing lip 12d and the inner sealing lip 11f of said at least one ascending strand 1b can advantageously be connected via the angle connector 10 (for example, molded) to the outer sealing lip 9b and to an inner sealing lip 9a of the upper strand 1a, respectively, which makes it possible to obtain continuous sealing ensured for the or each ascending strand 1b and the upper strand 1a, both on the outer face Ve and on the inner face Vi of the window V.

It should also be noted that the outer end lip 12d that is pressed both, on the one hand, against the vertical edge 2a" of the outer vertical trim 2a (first embodiment of FIG. 3 or 3a) or against the vertical edge 2A" of the edge upright 2A of the frame 2 (second embodiment of FIG. 4) and, on the other hand, against the vertical edge V1 of the window V, makes it possible to hide any mounting play or interstitial space between the window V and the trim 2a or the frame upright 2A, depending on the case.

As previously explained, the hook 10a of the slide 10 combined with the specific shape of the outer branch 12 including the rigid groove 12a allows satisfactory control of the amplitude of the X+ and X− movements of the window V during sliding thereof in a vertical plane.

The invention claimed is:

1. An elastomer run seal suitable for receiving a sliding window of a motor vehicle side door, the sliding window being mounted laterally flush with an outer surface of a vertical edge element of a frame of the motor vehicle side door adjacent to the sliding window, said vertical edge element being chosen from among an upright of said frame and a vertical outer trim equipping said frame, the elastomer run seal comprising at least an ascending strand and a top strand, said at least one ascending strand having, in a single piece: (i) an axially outer branch able to be mounted sealably in contact with said vertical edge element and the sliding window, (ii) an axially inner branch able to be mounted on said frame, and (iii) a connecting branch connecting said axially outer branch to said axially inner branch, the elastomer run seal comprising a groove able to receive, by vertical sliding, a member which is configured to guide the sliding window and which is secured to an inner face of the sliding window, wherein said groove is formed on said axially outer branch and is positioned so as to be next to said vertical edge element.

2. The elastomer run seal according to claim 1, wherein said axially outer branch comprises, past said groove, a flexible outer end zone able to be mounted in sealed contact against a vertical edge of the sliding window, such that said flexible outer end zone hides any mounting play or interstitial space between the sliding window and said vertical edge element.

3. The elastomer run seal according to claim 2, wherein said flexible outer end zone extends said rigid bearing zone by forming an outer sealing lip that comprises:
a first portion that is oriented axially outward and that is able to be mounted sealably in contact with a vertical edge of said vertical edge element, and
a second end portion that is oriented axially inward and that is able to be mounted sealably in contact with said vertical edge of the sliding window.

4. The elastomer run seal according to claim 3, wherein said flexible outer end zone is not able to be mounted in contact with an outer face of the window.

5. The elastomer run seal according to claim 1, wherein said groove extends substantially axially while being formed from at least one rigid elastomer material between said connecting branch and a rigid bearing zone comprised by said axially outer branch and that is situated below said flexible outer end zone, said rigid bearing zone protruding axially inward and being able to press sealably on an axially outer face of said guide member.

6. The elastomer run seal according to claim 5, characterized in that said rigid bearing zone comprises an axial bead that forms, with said connecting branch, which is also axial, edges of said groove, which is able to slidingly receive an end hook of said guide member and comprises a bottom optionally covered with an anti-friction coating.

7. The elastomer run seal according to claim 1, wherein said axially outer branch is able to cooperate in an offset manner in the longitudinal direction of the motor vehicle with said guide member to simultaneously guide the sliding of the sliding window in an axial direction of the motor vehicle and in said longitudinal direction.

8. The elastomer run seal according to claim 1, wherein which has an asymmetrical U shape, and said axially inner branch ends with a flexible inner end zone that is able to be mounted sealably on said inner face of the sliding window separated from said guide member and that connects said at least one ascending strand to said top strand with continuous sealed contact over said inner face of the sliding window despite the presence of said guide member.

9. The elastomer run seal according to claim 8, wherein said flexible inner end zone comprises an inner sealing lip that extends obliquely toward said connecting branch from a portion of said axially inner branch able to be mounted on said frame of the door, said portion for example comprising a recess intended to be mounted on an inner trim of said door frame or being curved directly against said frame.

10. A sealing module for a motor vehicle side door comprising an elastomer as defined in claim 1.

11. The sealing module according to claim 10, wherein said guide member is formed by at least one slide extending continuously or discontinuously from said inner face of the sliding window over at least one upper zone of said at least one vertical edge, the sliding window comprising a vertical edge that is not covered by said at least one slide and against which said axially outer branch of the seal is sealably applied.

12. The sealing module according to claim 11, wherein said at least one slide ends with a hook that is curved axially outward and that slides in said groove made from at least one rigid elastomer material, such that the amplitude of the movement of the sliding window is controlled by the sliding of said hook in said groove simultaneously in axial and longitudinal directions of the vehicle.

13. The module according to claim 12, wherein at least one slide comprises a base secured to said inner face of the window below said at least one vertical edge that extends axially inward, and that is extended by a leg extending substantially in the axial direction past said at least one vertical edge and ending with said hook.

14. The sealing module according to claim 12, wherein the module further comprises said vertical element across from which said hook and said groove cooperate by sliding, a flexible outer end zone comprised by said axially outer branch of the seal and that is pressed both against a vertical edge of said vertical element and against said vertical edge of the sliding window conceals any mounting play or interstitial space between the sliding window and said vertical edge element.

15. The sealing module according to claim 12 wherein said at least one slide incorporating said hook extends over the entire height of said at least one vertical edge.

16. The sealing module according to claim 10, wherein said axially inner branch ends with a flexible inner end zone that is mounted sealably on said inner face of the sliding window separated from said guide member and that connects said at least one ascending strand to said top strand with continuous sealed contact over said inner face of the sliding window.

\* \* \* \* \*